(12) United States Patent
Hanson et al.

(10) Patent No.: US 12,723,855 B2
(45) Date of Patent: Sep. 1, 2026

(54) PRACTICE WEIGHTED INSERT FOR FIREARM MAGAZINE

(71) Applicants: Eric Hanson, Glen Gardner, NJ (US); Jennifer Hanson, Glen Gardner, NJ (US); Michael Finocchiaro, Watchung, NJ (US); James E. O'Shea, Jr., Annandale, NJ (US)

(72) Inventors: Eric Hanson, Glen Gardner, NJ (US); Jennifer Hanson, Glen Gardner, NJ (US); Michael Finocchiaro, Watchung, NJ (US); James E. O'Shea, Jr., Annandale, NJ (US)

(73) Assignee: Couple a Buds LLC, Glen Gardner, NJ (US)

( * ) Notice: Subject to any disclaimer, the term of this patent is extended or adjusted under 35 U.S.C. 154(b) by 215 days.

(21) Appl. No.: 18/818,756

(22) Filed: Aug. 29, 2024

(65) Prior Publication Data

US 2026/0063401 A1 Mar. 5, 2026

(51) Int. Cl.
*F42B 8/00* (2006.01)
*G09B 19/00* (2006.01)

(52) U.S. Cl.
CPC ................ *F42B 8/00* (2013.01); *G09B 19/00* (2013.01)

(58) Field of Classification Search
None
See application file for complete search history.

(56) References Cited

U.S. PATENT DOCUMENTS

| | | | | |
|---|---|---|---|---|
| 10,295,317 | B2 * | 5/2019 | Browning | F41A 33/00 |
| 10,563,947 | B2 | 2/2020 | Sawicki | |
| 11,204,214 | B2 | 12/2021 | Kirsch | |
| 2023/0280134 | A1 | 9/2023 | Allgaier et al. | |

OTHER PUBLICATIONS

Rogers Shooting School 9mm-.40 Tap Rack Training Aid (TRT), rogersshootingschool.com. https://rogersshootingschool.com/products/rogers-shooting-school-tap-rack-training-aid-trt [Date accessed: Sep. 13, 2024].

* cited by examiner

*Primary Examiner* — James B Hull
(74) *Attorney, Agent, or Firm* — Michael J. Feigin, Esq.; Feigin and Fridman LLC

(57) ABSTRACT

A weighted safety-insert for a magazine of a firearm. The safety-insert includes a body and a slidable portion. The body includes a protrusion extending downwardly from a bottom surface, and a channel extends within each of first and second side walls. A pair of flanges extend outwardly from the side walls, adjacent the bottom surface. The slidable portion, includes a top surface, and first and second side wall, each having an upper end disposed higher than the top surface and terminating in an inwardly facing lip. The slidable portion is adapted to engage the body such that the top surface of the slidable portion rests against the top surface of the body, the inwardly facing lips being slidably disposed within the channels in the side walls of the body or a prismatic protrusion of the slideable portion being slidably disposed in a channel in the top side of the body.

14 Claims, 16 Drawing Sheets

132
130
116b
162
112
122
120
116a 122
120
154
166
110
132
112
150
162
152
176
156
174
160
166
164
168

212
206
204
158
166
168
208
202

110
150
166
206
204
202

110
150
206
204
166
202

110
150
206
204
202

220
112
110
150
200
206
204
202

222
150
212
110
206
204
202

212
132
150
110
212
204
122
212
202

PRACTICE WEIGHTED INSERT FOR FIREARM MAGAZINE

BACKGROUND OF THE DISCLOSED TECHNOLOGY

Integral or removable magazines store and feed ammunition to semi-automatic firearms. The magazine, functions by feeding the cartridges stored within the magazine into a position where they may be loaded into the barrel chamber and shot out of the firearm.

Dummy or practice magazines are used for practice and training purposes. Such magazines are particularly useful when "dry firing" to practice firearm techniques such as grip, drawing, sighting, trigger control, handling malfunctions, and more. Practice magazines also add an element of safety, for example by being clearly identifiable or visually distinct from real magazines, thereby significantly reducing the risk of a real magazine being mistakenly treated as a practice magazine.

It is important that practice magazines mimic the feel and experience of actual magazines, for example in the weight, and function. One method of achieving this goal is loading a real magazine with dummy rounds. However, this method requires many dummy rounds, which are expensive to buy in the amount required and time consuming to properly load. Additionally, there may be safety concerns with inadvertently loading actual live rounds into the magazine.

There is thus a need in the art for a practice magazine which provides a realistic experience of use of the magazine, while being safe, fast and easy to load, reload, and provides a realistic experience of the true weight of inserting and ejecting the magazine into the firearm.

SUMMARY OF THE DISCLOSED TECHNOLOGY

The disclosed technology described herein addresses a need, unfulfilled in the prior art, for providing a practice weighted magazine insert for use with a firearm, which magazine provides a realistic experience of use while being safe, fast, and easy to use.

In accordance with an aspect of an embodiment of the disclosed technology, there is provided a weighted safety-insert for a magazine of a firearm. The safety-insert includes a body, including first and second side walls, front and back walls, a bottom surface, and a top surface. A protrusion extends downwardly from the bottom surface. A pair of flanges extend outwardly from the side walls of the body, adjacent the bottom surface thereof.

The slidable portion may have an elongated prismatic protrusion, while the top surface of the body houses a channel having a prismatic shape congruent to the prismatic shape of the protrusion. The elongated prismatic protrusion is thus insertable within the channel in the top surface such that the elongated protrusion is slidably disposed within the channel of the top surface. The protrusion may have a planar surface which, whilst the slidable portion is slidably disposed within the channel of the top surface, is parallel to the top surface.

In some embodiments, a channel extends within each of the first and second side walls. The weighted safety insert further includes a slidable portion, including a top surface, and first and second side walls disposed on opposing lateral sides of the top surface of the slidable portion, each having an upper end disposed higher than the top surface of the slidable portion, and each terminating in an inwardly facing lip.

The slidable portion is adapted to engage the body such that the top surface of the slidable portion rests against the top surface of the body, and the inwardly facing lips of the slidable portion are slidably disposed within the channels in the side walls of the body.

In some embodiments, top surface of the body is angled relative to the bottom surface of the body. In some embodiments, the channels are substantially parallel to the top surface of the body.

In some embodiments, the slidable portion further includes first and second walls segments extending substantially at a substantially right angle relative to the top surface of the slidable portion, and connecting to the upper ends of the side walls of the slidable portion by bends, such that the wall segments are substantially parallel to the side walls of the slidable portion.

In some embodiments, within the slidable portion, the inwardly facing lip of the first wall is disposed further away from the top surface than the inwardly facing lip of the second wall.

In some embodiments, within the body, the channel in the first side wall is disposed further away from the top surface than the channel in the second side wall, to accommodate the locations of the inwardly facing lips of the slidable portion.

In some embodiments, the protrusion of the body includes a planar wall which is substantially aligned with the first side wall of the body, and a curved wall connecting an end of the planar wall to the bottom surface.

In accordance with an aspect of an embodiment of the disclosed technology, there is provided a magazine for a firearm. The magazine includes a hollow body terminating, at a bottom end thereof, in a base plate and defining an upper opening, the upper opening being lined by feed lips, and a spring having a first end attached to the base plate and a second end attached to a follower. The magazine further includes the weighted safety insert described hereinabove. The protrusion of the body engages the follower, and the upper ends of the side walls of the slidable portion engage the feed lips, such that the spring is compressed by presence of the safety-insert within the hollow body of the magazine.

In some embodiments, at least one of a weight, a weight distribution, and a center of gravity of the magazine is equal to a corresponding measurement of a standard magazine for the firearm, at least partially loaded with rounds.

In some embodiments, when the magazine is loaded within the firearm, during racking of the slide of the firearm, the slide passes between the side walls of the slidable portion and is not obstructed by the safety-insert.

In accordance with an aspect of an embodiment of the disclosed technology, there is provided a method of inserting the weighted safety-insert described hereinabove into a firearm magazine. The method includes arranging the slidable portion to be flush with the front wall of the body of the safety-insert, and sliding the safety insert into an upper opening of the magazine, such that the protrusion engages a follower of the magazine, and the flanges are disposed beneath feed lips surrounding the upper opening of the magazine. The method further includes pushing the safety-insert downward into a body of the magazine against the follower, thereby compressing a spring disposed within the body of the magazine and connected to the follower, and sliding the slidable portion toward the back wall of the body of the safety-insert, such that upper ends of the side walls of the slidable portions engage, and are limited by, the feed lips of the magazine, thereby securing the safety-insert within the body of the magazine.

BRIEF DESCRIPTION OF THE DRAWINGS

FIG. 10A is a perspective view illustration of a second step of loading a firearm magazine with the practice insert of FIGS. 5 to 8 according to embodiments of the disclosed technology.

FIG. 10B is a side view planar illustration of the second step of loading a firearm magazine with the practice insert of FIGS. 5 to 8 according to embodiments of the disclosed technology.

DETAILED DESCRIPTION OF EMBODIMENTS OF THE DISCLOSED TECHNOLOGY

The presently disclosed technology is directed towards a practice insert for a firearm magazine, which mimics the weight of a typical loaded firearm magazine. The weighted safety-insert includes a body and a slidable portion. The body includes a protrusion extending downwardly from a bottom surface, and a channel extends within each of first and second side walls. A pair of flanges extend outwardly from the side walls, adjacent the bottom surface. The slidable portion, includes a top surface, and first and second side walls, each having an upper end disposed higher than the top surface and terminating in an inwardly facing lip. The slidable portion is adapted to engage the body such that the top surface of the slidable portion rests against the top surface of the body, and the inwardly facing lips of the slidable portion are slidably disposed within the channels in the side walls of the body.

Figures 1, 2A:
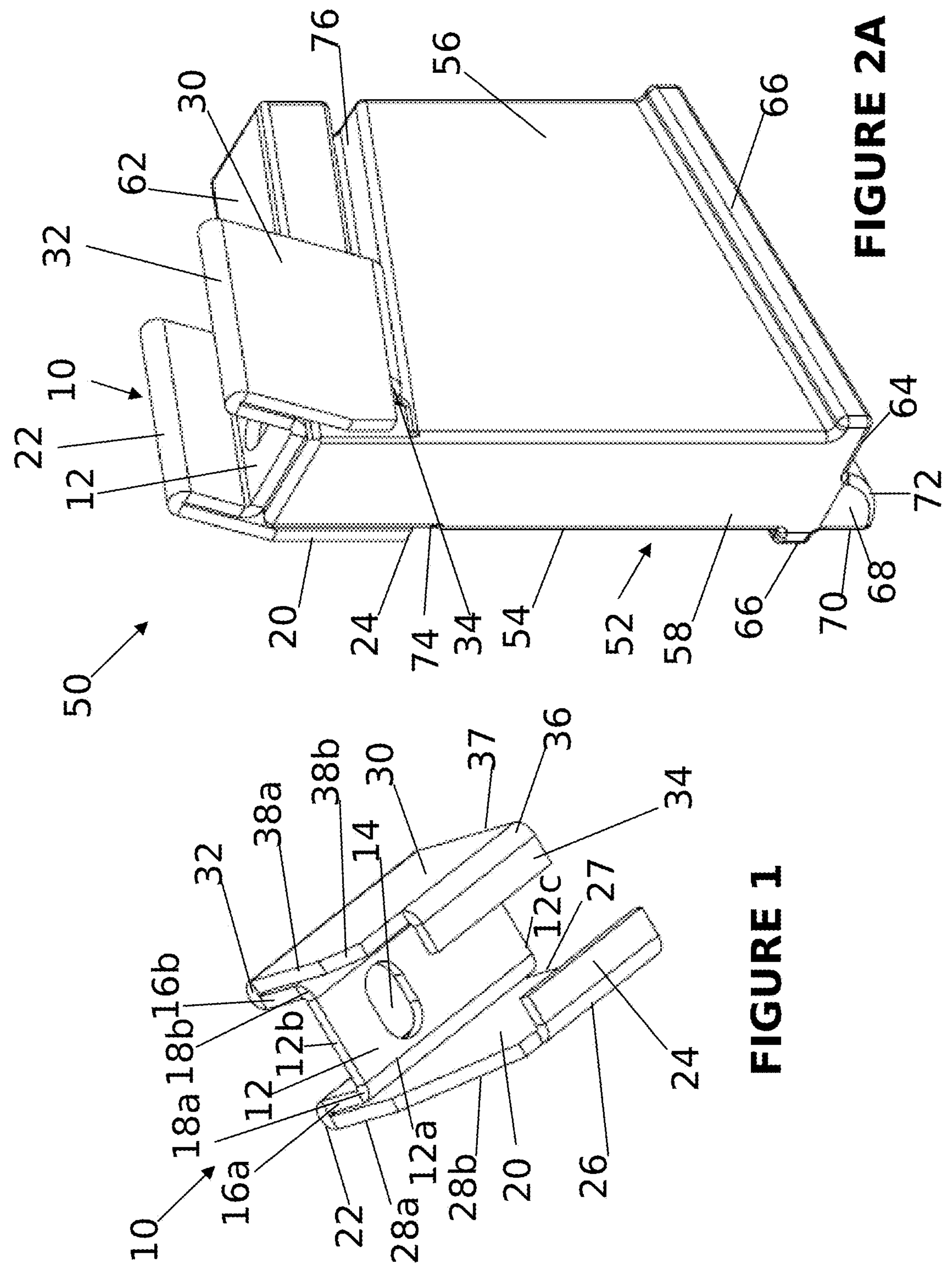
FIG. 1 shows a perspective view of a slidable portion of a practice insert for a firearm magazine according to an embodiment of the disclosed technology.
FIG. 2A is a perspective view of a practice insert for a firearm magazine according to an embodiment of the disclosed technology, the practice insert including the slidable portion of FIG. 1.
Figure 3A:
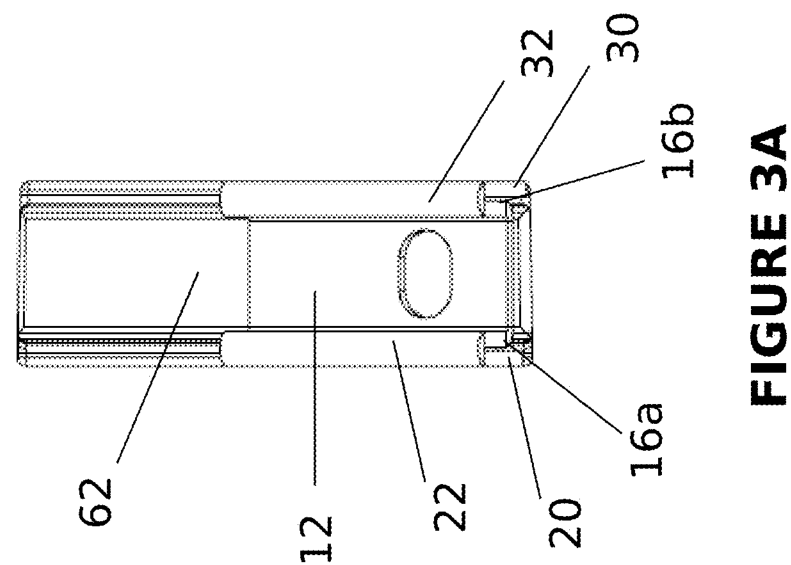
FIG. 3A is a top planar views of the practice insert of FIGS. 2A and 2B according to an embodiment of the disclosed technology.

FIG. 1 shows a perspective view of a slidable portion 10 of a practice insert for a firearm magazine according to an embodiment of the disclosed technology.

Slidable portion 10 includes a generally rectangular upper wall 12 disposed at a top portion thereof. Upper wall 12 defines lateral edges 12*a*, a front edge 12*b*, and a rear edge 12*c*. In some embodiments, upper wall 12 may include one or more bores 14.

Upper wall 12 has a pair of wall segments 16*a* and 16*b* extending upwardly from lateral edges 12*a*, such that upper wall 12 is recessed relative to upper ends of wall segments 16*a* and 16*b*. In some embodiments, wall segments 16*a* and 16*b* extend to the same height relative to upper wall 12. In some embodiments, upper wall 12 is connected to wall segments 16*a* and 16*b* by respective bends 18*a* and 18*b*, which in some embodiments are 90-degree, or approximately 90-degree bends. In some embodiments, the widths of wall segments 16*a* and 16*b* are substantially equal to the lengths of the lateral edges 12*a* of upper wall 12.

Wall segment 16*a* is connected to a first side wall 20 by a 180-degree bend 22 disposed at an upper end of first side wall 20. At a lower end thereof, first side wall 20 is connected to a lip 24 by a bend 26, which may be a 90-degree bend. As such, a surface of lip 24 perpendicular to first side wall 20 is substantially parallel to a surface of upper wall 12. In some embodiments, bend 22 is a tight bend, such that wall segment 16*a* is adjacent to, and in some embodiments engages, first side wall 20.

In some embodiments, the width of an upper portion of first side wall 20 is substantially equal to the length of lateral edge 12*a* of upper wall 12 and to the length of side wall 16*a*. In some embodiments, a front edge 27 of first side wall 20 (seen clearly in FIG. 2B) is substantially perpendicular to back edge 12*c* of upper portion 12. In some embodiments, a back edge of first side wall 20 includes an upper portion 28*a* which is substantially perpendicular to front edge 12*b* of upper portion 12, and a lower portion 28*b* which is angled with respect to rear edge 12*c* of upper portion 12, such that the width of first side wall 20 tapers away from front edge 12*b* of upper wall 12. As a result, lip 24 is shorter lateral edge 12*a* of upper wall 12.

Wall segment 16*b* is connected to a second side wall 30 by a 180-degree bend 32 disposed at an upper end of second side wall 30. At a lower end thereof, second side wall 30 is connected to a lip 34 by a bend 36, which may be a 90-degree bend. As such, a surface of lip 34 perpendicular to second side wall 30 is substantially parallel to a surface of upper wall 12. In some embodiments, bend 32 is a tight bend, such that wall segment 16*b* is adjacent to, and in some embodiments engages, second side wall 30.

In some embodiments, the width of an upper portion of second side wall 30 is substantially equal to the length of lateral edge 12*a* of upper wall 12 and to the length of side wall 16*b*. In some embodiments, a front edge 37 of second side wall 30 (seen in FIG. 2B) is substantially perpendicular to back edge 12*c* of upper portion 12. In some embodiments, a back edge of second side wall 30 includes an upper portion 38*a* which is substantially perpendicular to front edge 12*b* of upper portion 12, and a lower portion 38*b* which is angled with respect to rear edge 12*c* of upper portion 12, such that the width of second side wall 30 tapers away from rear edge 12*c* of upper wall 12. As a result, lip 34 is shorter lateral edge 12*a* of upper wall 12.

In some embodiments, and as illustrated, a length of first side wall 20, between bends 22 and 26, is greater than a length of second side wall 30, between bends 32 and 36. As such, lip 34 of second side wall 30 is vertically closer to upper wall 12 than lip 24 of first side wall 20.

It is to be appreciated that in the embodiment of FIG. 1, upper wall 12 does not extend beyond wall segments 16*a* and 16*b*, or beyond the widest portions of side walls 20 and 30. As such, upper wall 12 is disposed entirely between side walls 20 and 30.

In some embodiments, slidable portion 10 may be integrally formed from a single piece of material, such as by suitable molding, three-dimensional printing, or any other suitable method.

Figure 2B:
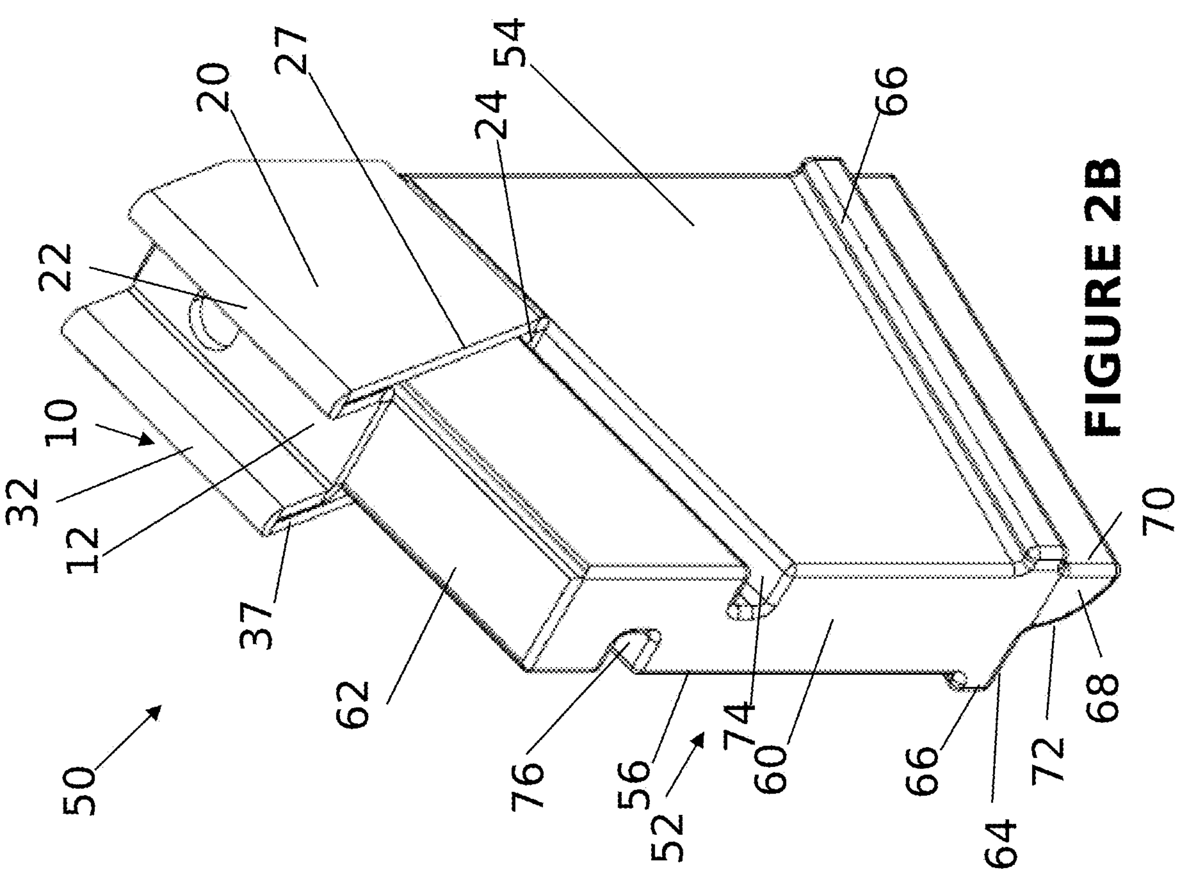
FIG. 2B is a second perspective view of a practice insert for a firearm magazine according to an embodiment of the disclosed technology, the practice insert including the slidable portion of FIG. 1.
Figure 3C:
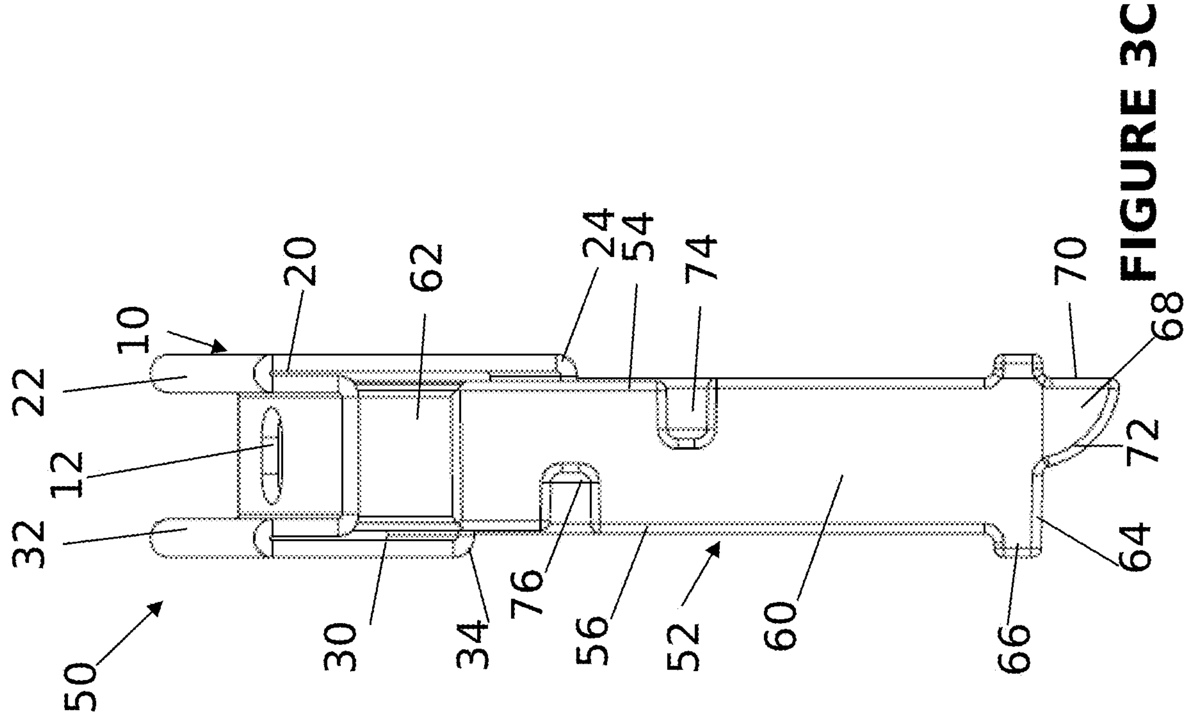
FIG. 3C is a back planar views of the practice insert of FIGS. 2A and 2B according to an embodiment of the disclosed technology.
Figure 3B:
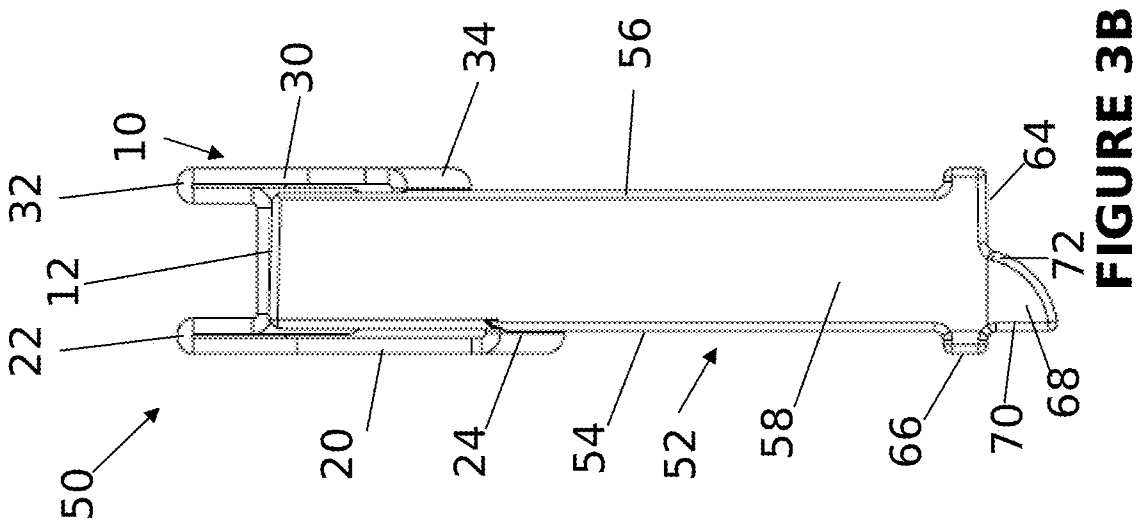
FIG. 3B is a front planar views of the practice insert of FIGS. 2A and 2B according to an embodiment of the disclosed technology.
Figure 4:
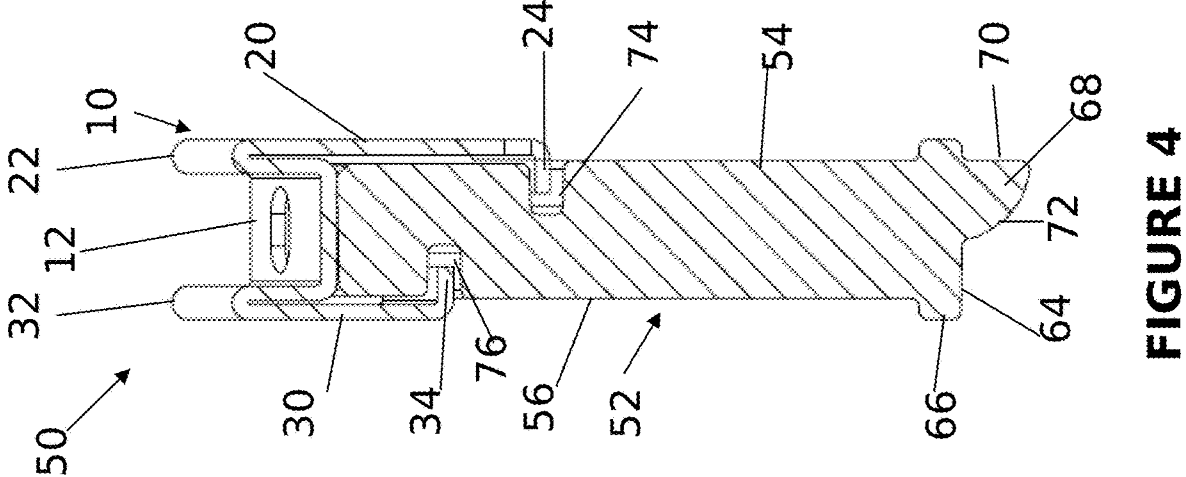
FIG. 4 is a cross-sectional view of practice insert of FIGS. 2A and 2B according to an embodiment of the disclosed technology, the cross sectional view being taken along section lines IV-IV in FIG. 3D.
Figure 3D:
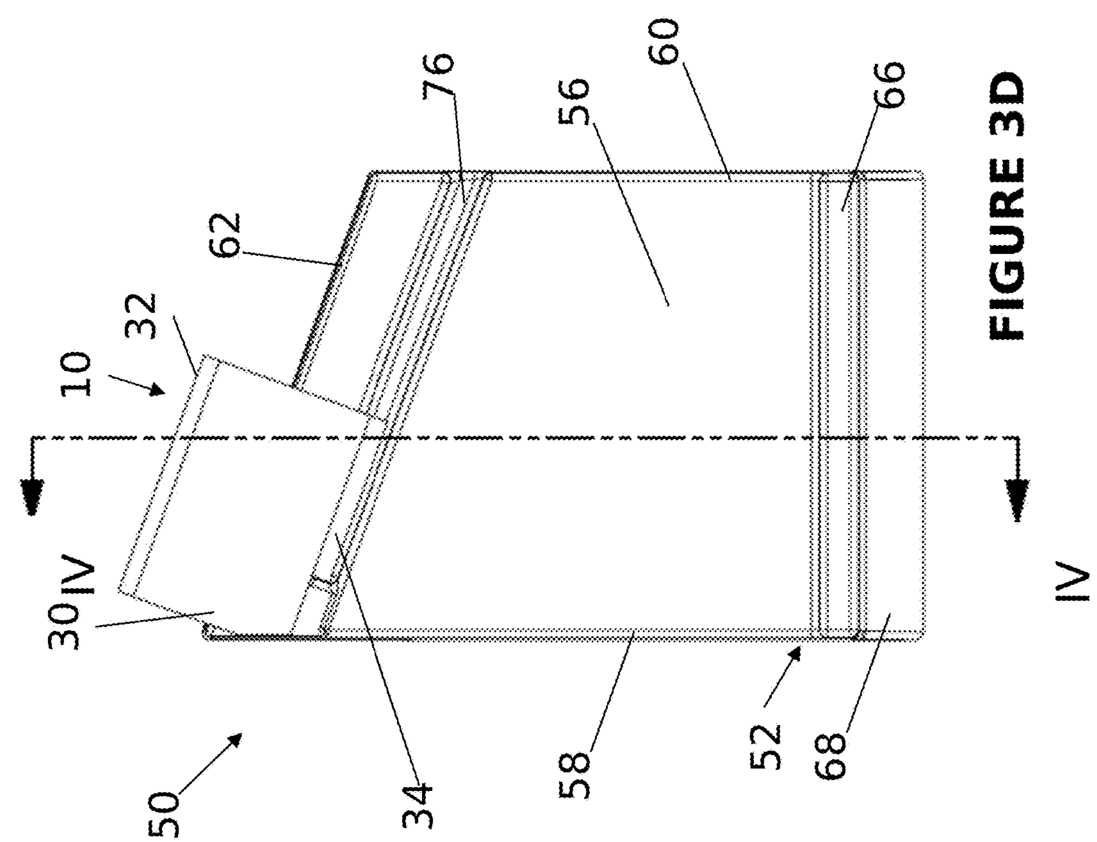
FIG. 3D is a side planar views of the practice insert of FIGS. 2A and 2B according to an embodiment of the disclosed technology.

Reference is now made to FIGS. 2A and 2B, which are perspective views of a practice insert 50 for a firearm magazine according to an embodiment of the disclosed technology, to FIGS. 3A, 3B, 3C, and 3D are, respectively, top, back, front, and side planar views of practice insert 50, and to FIG. 4 is a cross-sectional view of practice insert 50. As seen, practice insert 50 includes slidable portion 10 of FIG. 1.

Practice insert 50 includes a body 52, which defines a first side wall 54, a second side wall 56, a rectangular front wall 58, a rectangular back wall 60, a rectangular upper surface 62, and a rectangular lower surface 64. Side walls 54 and 56 are substantially parallel to each other, and substantially perpendicular to front wall 58 and to back wall 60, which are also substantially parallel to each other. As such, a vertical footprint of body 52 is substantially rectangular.

Front wall 58 and back wall 60 are generally rectangular, but front wall 58 is longer than back wall 60. Lower surface 64 is at a generally right angle to front wall 58 and to back wall 60, such that rectangular upper surface 62 is disposed at a slant relative to the front and back walls. As a result, first side wall 54 and second side wall 56 are substantially trapezoidal.

Flanges 66 extends outwardly of each of side walls 54 and 56, adjacent lower surface 64, such that the width of lower surface 64 is greater than the width of upper surface 62.

A protrusion 68 extends downwardly from lower surface 64, along an entire length thereof. Protrusion 68 includes a planar surface 70 which is generally flush with first side wall 54 and generally perpendicular to lower surface 64. Protrusion 68 further includes an arced surface 72, extending in an arc from a bottom end of planar surface 70 to lower surface 64, such that protrusion 68 spans approximately half of the distance between side walls 54 and 56. As explained in further detail hereinbelow, when disposed within a firearm magazine, protrusion 68 is adapted to engage the follower, such that insert 50 functions as a weighted ammunition replacement.

First side wall 54 includes a first channel 74, which extends into back wall 60, but terminates prior to front wall 58. First channel 74 is angled relative to lower surface 64 and is substantially parallel to upper surface 62. A distance between upper surface 62 and first channel 74 is substantially equal to a distance between upper wall 12 and lip 24 of slidable portion 10. Similarly, second side wall 56 includes a second channel 76, which extends into back wall 60, but terminates prior to wall 58. Second channel 76 is angled relative to lower surface 64 and is substantially parallel to upper surface 62. A distance between upper surface 62 and second channel 76 is substantially equal to a distance between upper wall 12 and lip 34 of slidable portion 10.

As seen, slidable portion 10 is disposed around body 52, such that upper wall 12 thereof engages upper surface 62, lip 24 is disposed within first channel 74, and lip 34 is disposed within second channel 76, and bends 22 and 32 are disposed above, and substantially parallel to, upper surface 62. In this arrangement, slidable portion 10 may be slidably attached body 52 by inserting lips 24 and 34 into channels 74 and 76, respectively, at back wall 60, and slid toward front wall 58 along channels 74 and 76, to reach the orientation shown in FIGS. 2A to 4.

It is to be appreciate that, because upper wall 12 of slidable portion 10 does not extend beyond side walls 20 and 30, the vertical footprint of safety-insert 50 (which includes slidable portion 10 as well as body 52) is identical to the vertical footprint of body 52, when slidable portion 10 is removed therefrom.

Figures 5, 6A:
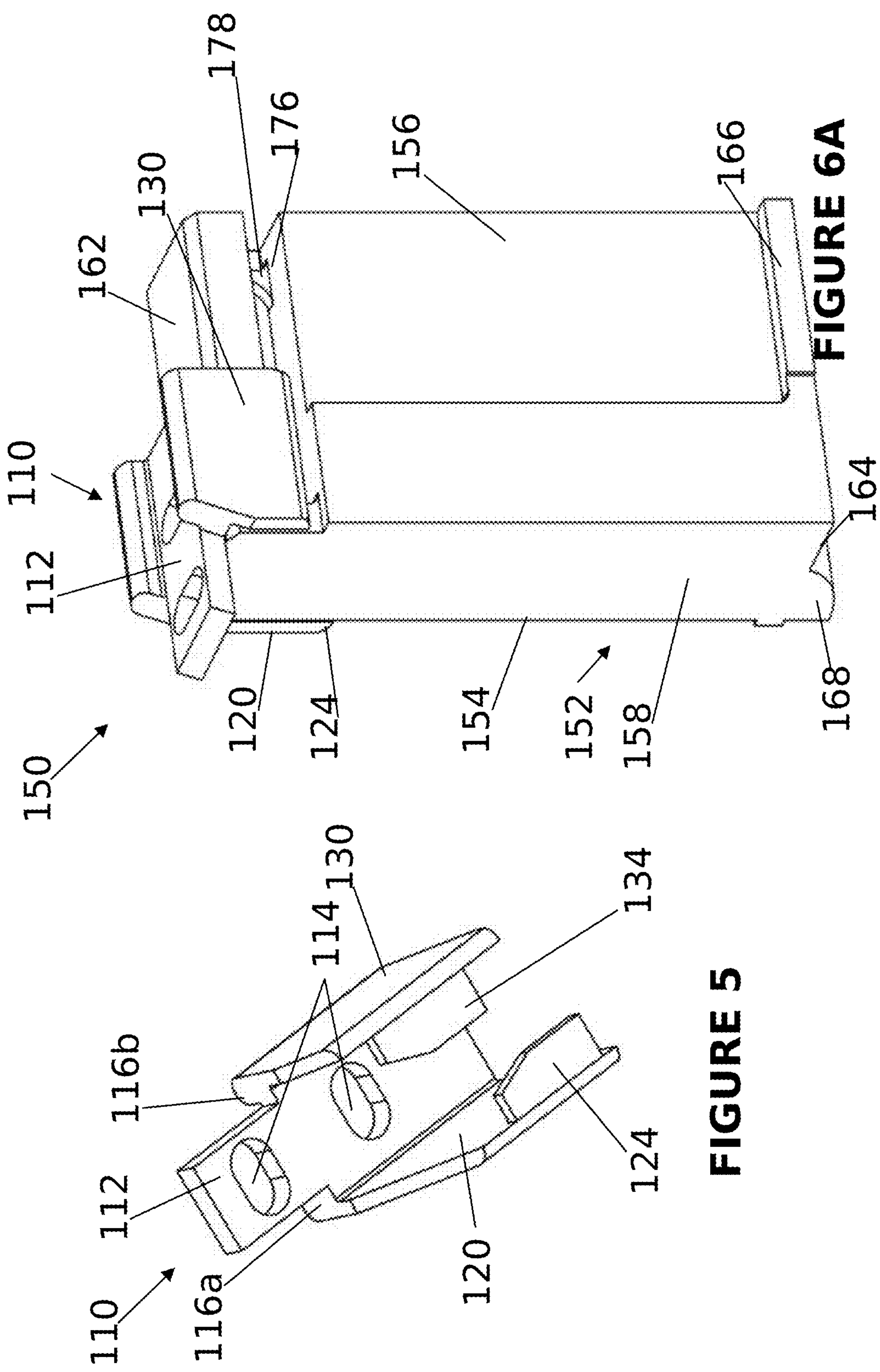
FIG. 5 shows a perspective view of a slidable portion of a practice insert for a firearm magazine according to another embodiment of the disclosed technology.
FIG. 6A is a perspective view of a practice insert for a firearm magazine according to another embodiment of the disclosed technology, the practice insert including the slidable portion of FIG. 5.

Reference is now made to FIG. 5, which shows a perspective view of a slidable portion 110 of a practice insert for a firearm magazine according to another embodiment of the disclosed technology. Slidable portion 110 is substantially similar to, or a variant of, slidable portion 10 of FIG. 1, with like numbers indicating like elements (the numbers of elements in slidable portion 110 being offset by 100 from the numbers of corresponding elements in slidable portion 10). As such, and for brevity, the description herein relates only to the distinctions of slidable portion 110 relative to slidable portion 10 of FIG. 1.

The main distinction between slidable portion 10 and slidable portion 110 is that in slidable portion 110, upper wall 112 includes a section extending beyond ends of wall segments 116*a* and 116*b*, and beyond ends of side walls 120 and 130. In some embodiments, upper wall 112 includes two or more bores 114. In slidable portion 110, no slot is formed between wall segment 116*a* and wall segment 120, and/or between wall segment 116*b* and wall segment 130.

Stated differently, as shown in FIG. 5, the widths of the upper portions of the side walls 120 and 103 are shorter than the length of the lateral edges 112*a* of upper wall 112. As such, a portion 140 of upper wall 112 is disposed in front of respective edges 128*a* and 138*a* of side walls 120 and 130.

Figures 6B, 7A:
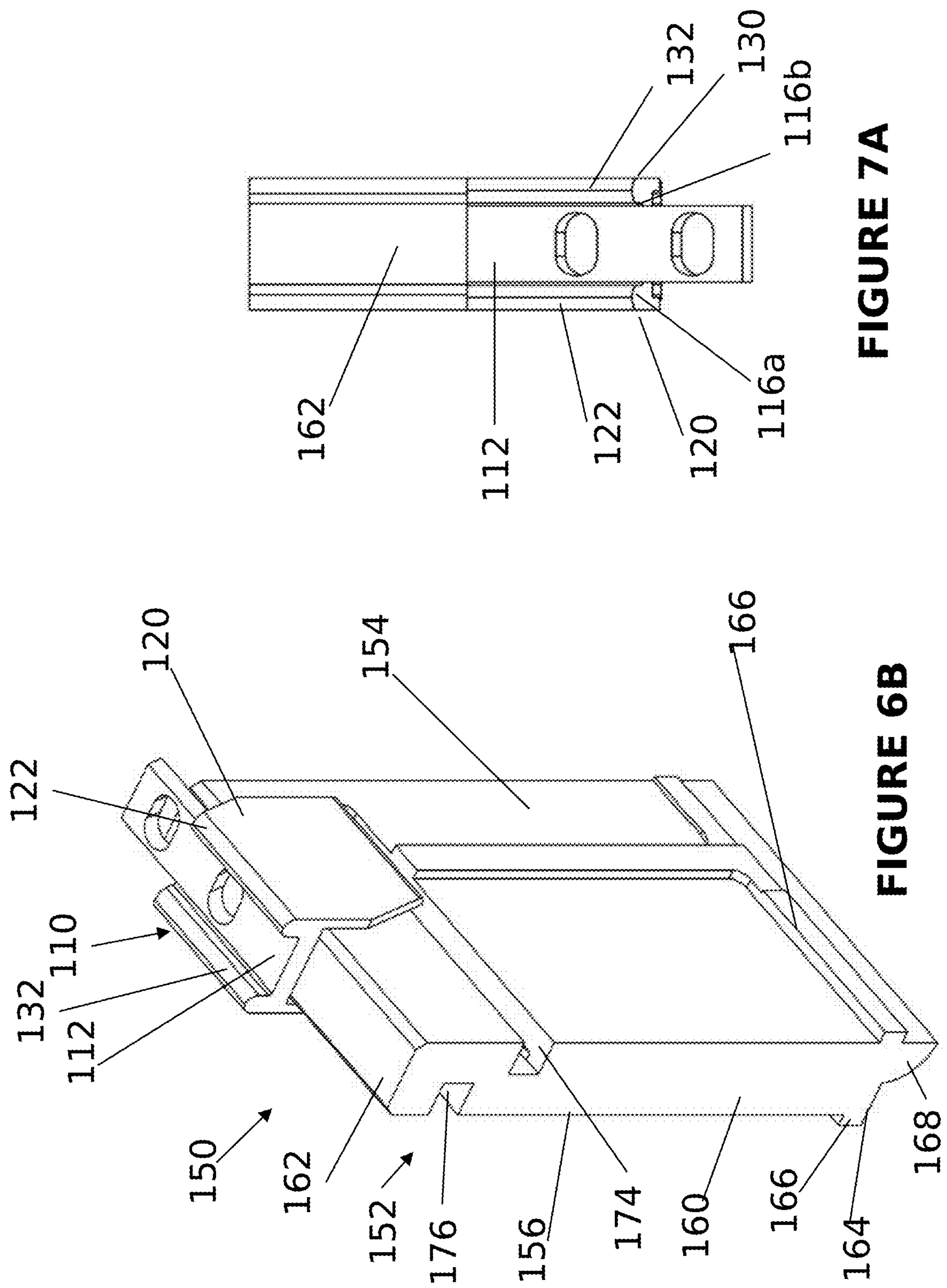
FIG. 6B is a second perspective view of a practice insert for a firearm magazine according to another embodiment of the disclosed technology, the practice insert including the slidable portion of FIG. 5.
FIG. 7A is a top planar view of the practice insert of FIGS. 6A and 6B according to an embodiment of the disclosed technology.
Figure 7C:
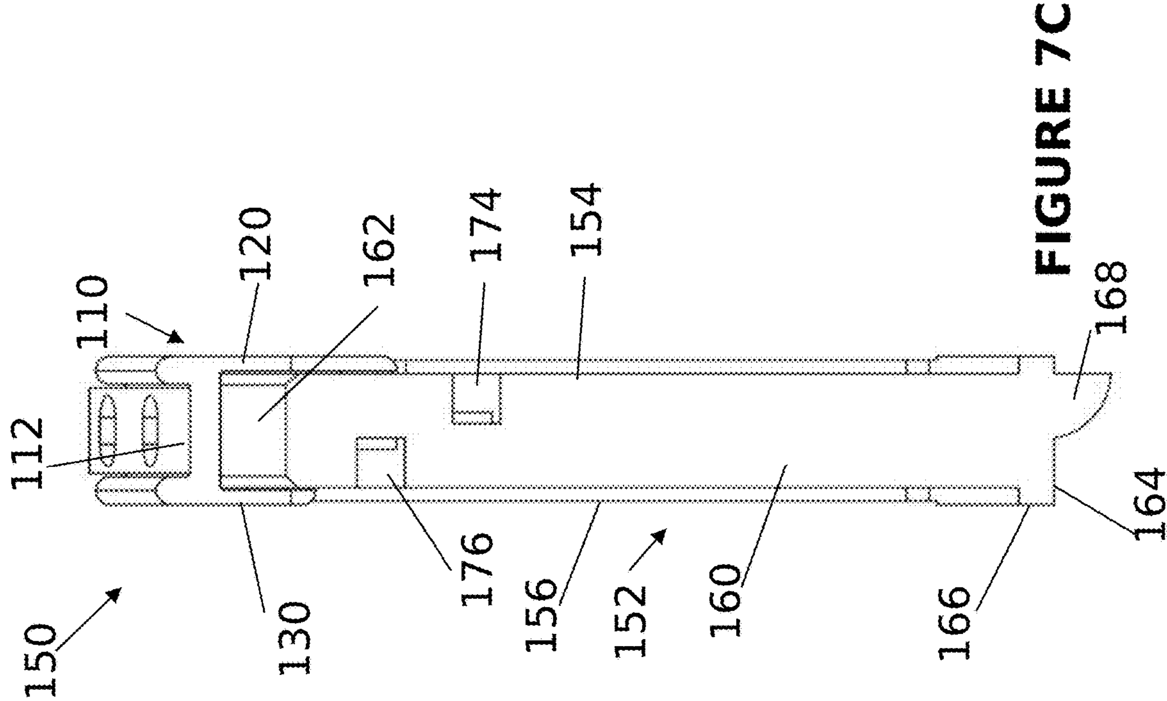
FIG. 7C is a back planar view of the practice insert of FIGS. 6A and 6B according to an embodiment of the disclosed technology.
Figure 7B:
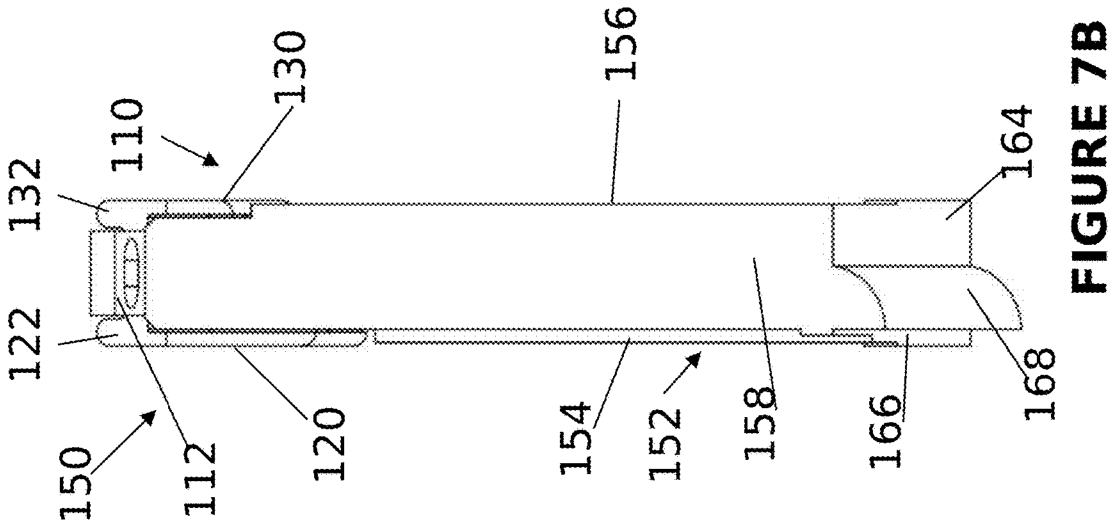
FIG. 7B is a front planar view of the practice insert of FIGS. 6A and 6B according to an embodiment of the disclosed technology.
Figure 8:
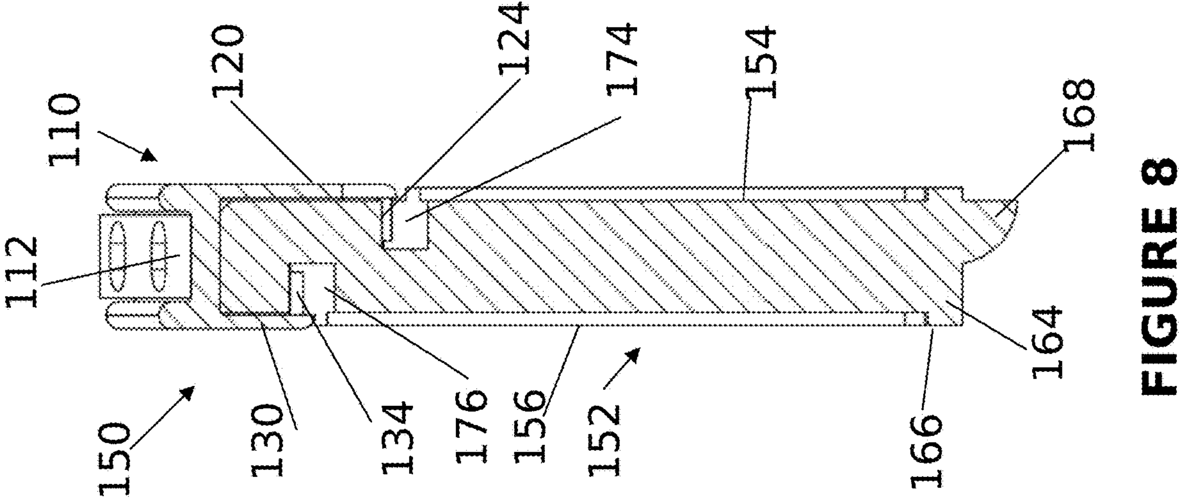
FIG. 8 is a cross-sectional view of practice insert of FIGS. 6A and 6B according to an embodiment of the disclosed technology, the cross sectional view being taken along section lines VIII-VIII in FIG. 7D.
Figure 7D:
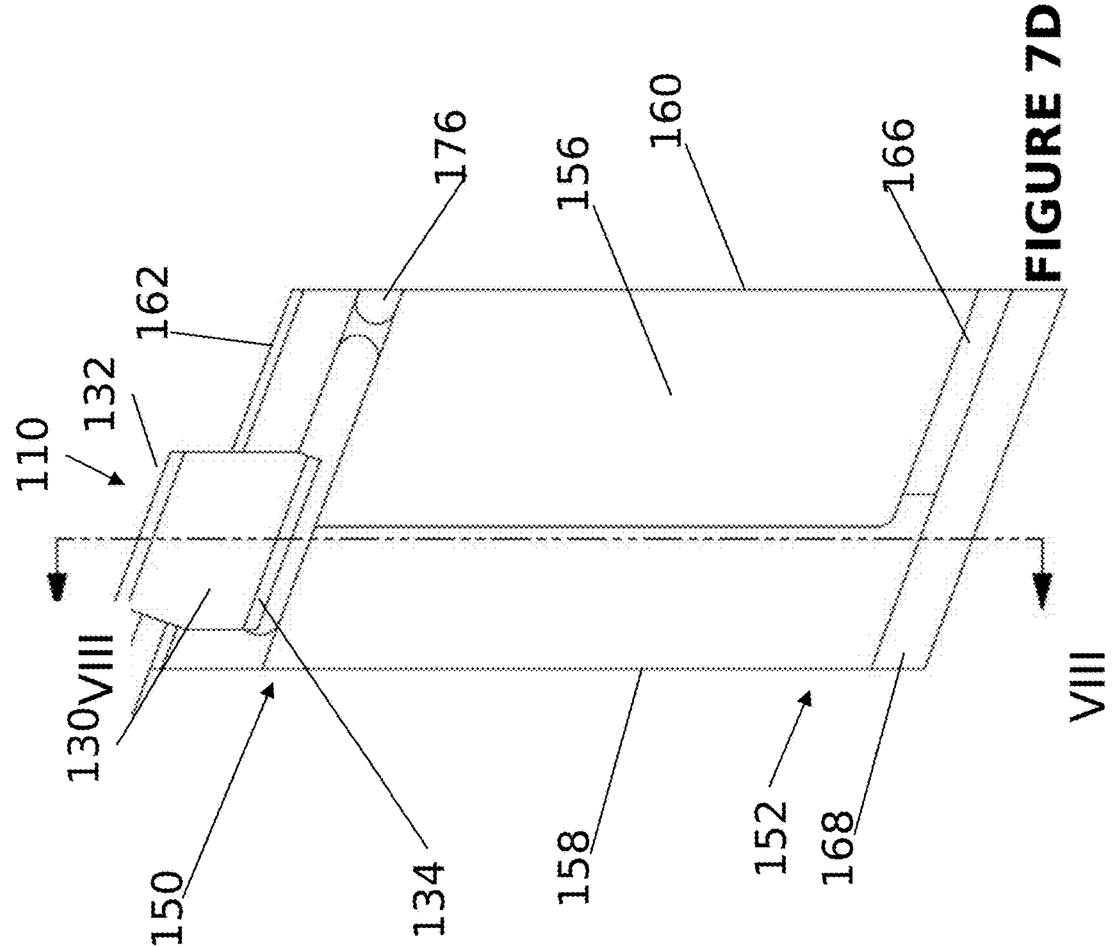
FIG. 7D is a side planar view of the practice insert of FIGS. 6A and 6B according to an embodiment of the disclosed technology.

Reference is now made to FIGS. 6A and 6B, which are perspective views of a practice insert 150 for a firearm magazine according to another embodiment of the disclosed technology, to FIGS. 7A, 7B, 7C, and 7D, which are, respectively, top, front, back, and side planar views of practice insert 150, and to FIG. 8, which is a cross-sectional view of practice insert 150. As seen, practice insert 150 includes slidable portion 110 of FIG. 5.

Practice insert 150 is substantially similar to, or a variant of, practice insert 50 of FIGS. 2A to 4, with like numbers indicating like elements (the numbers of elements in practice insert 150 being offset by 100 from the numbers of corresponding elements in practice insert 50). As such, and for brevity, the description herein relates only to the distinctions of practice insert 150 relative to practice insert 50 of FIGS. 2A to 4. Specifically, it is to be appreciated that body 152 of practice insert 150 is substantially identical to body 52 of practice insert 50 of FIGS. 2A to 4, with a few distinctions. In body 152, each of channels 174 and 176 may terminate in a stopper 178, adapted to prevent the slidable portion 110 from sliding off body 152.

Walls 156 and/or 154 may include multiple surfaces connected to each other by shoulders, such that some portions of body 152 may be narrower than other portions of the body. In some cases, flanges 166 may extend outwardly of the corresponding wall only along a portion of the wall, such that in other portions, the wall is flush with the edge of the flange, or the flange is narrower.

As discussed hereinabove with respect to FIG. 5, upper wall 112 of slidable portion 110 extends beyond side walls 120 and 130 thereof. As such, when lips 124 and 134 of slidable portion 110 are disposed in respective channels 174 and 176 of body portion 152, and the slidable portion is pushed as far as possible toward the front of body portion 152, upper wall 112 of the slidable portion extends beyond front wall 158 of body 152. Consequently, the vertical footprint of safety-insert 150 as shown in FIG. 7B, which includes slidable portion 110 disposed as far as possible to the front of body 152, is different from, and is greater than, the vertical footprint of body 152 when slidable portion 110 is removed therefrom.

FIGS. 9A to 12B are step-by-step illustrations of a method of loading a firearm magazine 200 with practice insert 150 of FIGS. 5 to 8 according to embodiments of the disclosed technology. It is to be appreciated that while the descriptions of FIGS. 9A to 12B are provided with respect to practice insert 150, the same operative steps are similarly applicable to practice insert 50 of 1 to 4 and to practice insert 150*a* of FIGS. 9A to 9D.

In FIGS. 9A to 12B, magazine 200 may be a standard magazine, including a body 202, a base plate 204 having a spring 206 fixed thereto, and a follower 208 fixedly attached to an opposite end of spring 206. Follower 208 is pushed by spring 206 into opening 210 of the magazine, and is held in place by feed lips 212.

Figures 9A, 9B:
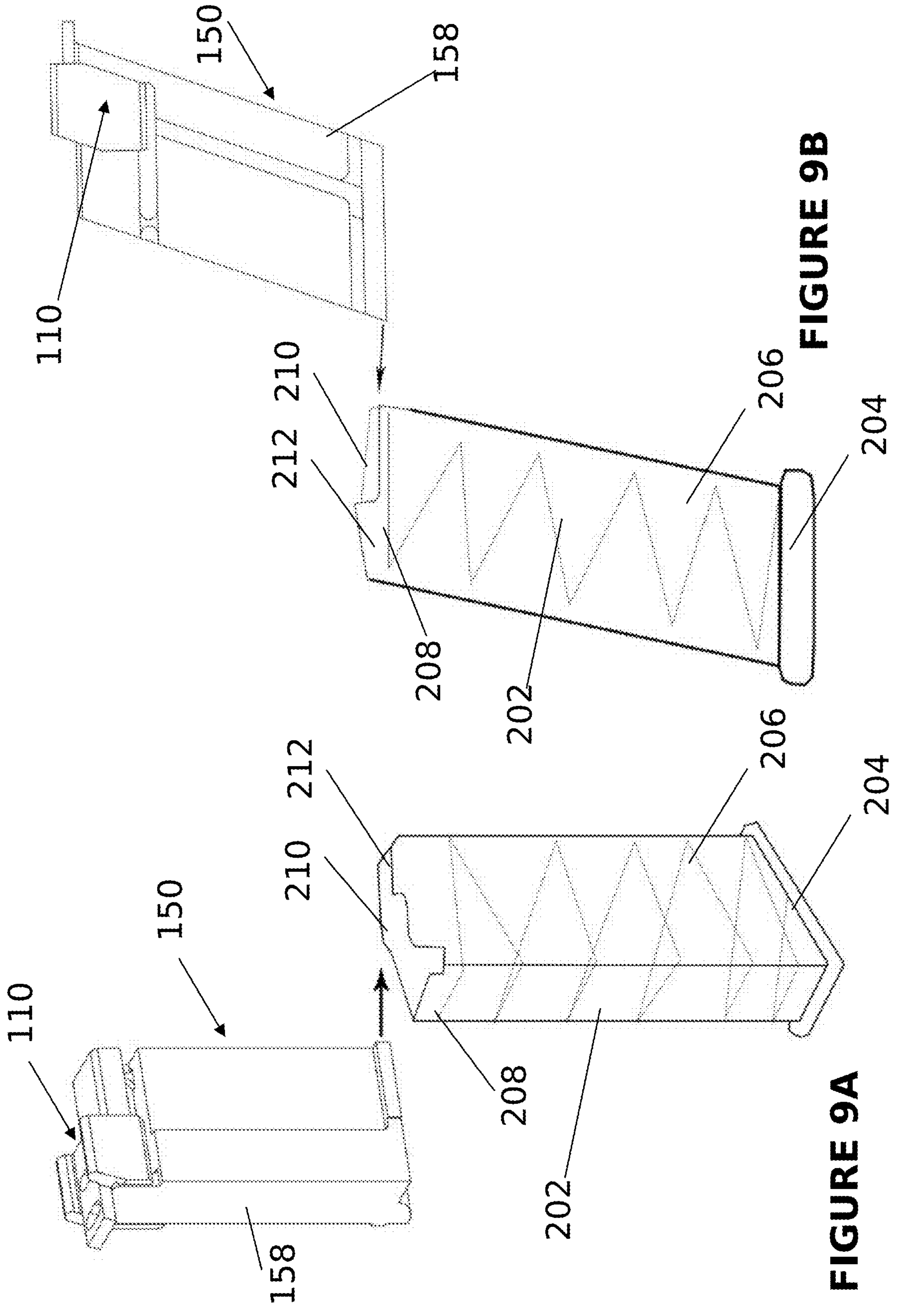
FIG. 9A is a perspective view illustration of a first step of loading a firearm magazine with the practice insert of FIGS. 5 to 8 according to embodiments of the disclosed technology.
FIG. 9B is a side view planar illustration of the first step of loading a firearm magazine with the practice insert of FIGS. 5 to 8 according to embodiments of the disclosed technology.
Figures 10A, 10B, 10C:
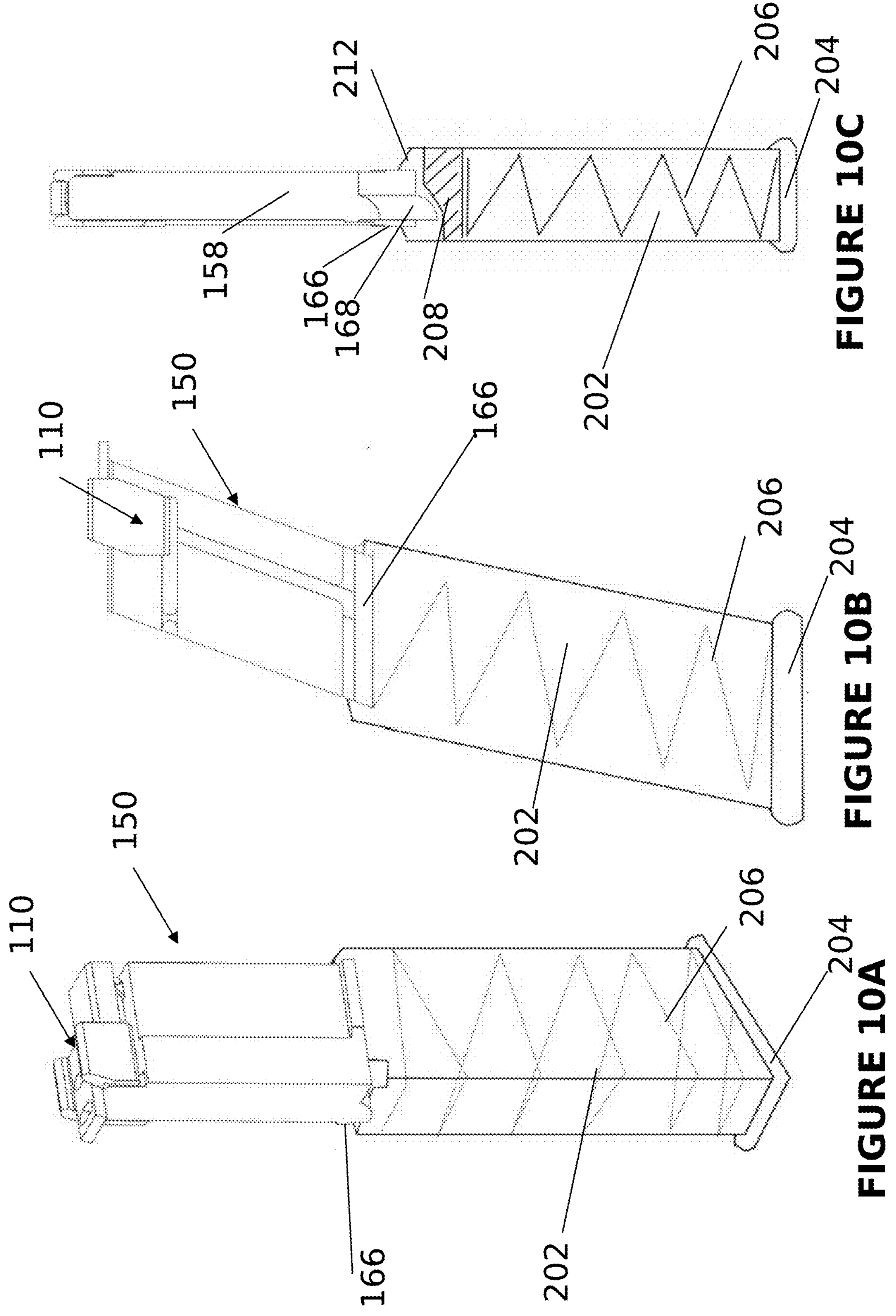
FIGS. 10A, 10B, and 10C are, respectively, a perspective view illustration, a side view planar illustration, and a front view illustration of a second step of loading a firearm magazine with the practice insert of FIGS. 5 to 8 according to embodiments of the disclosed technology.

As seen in FIGS. 9A and 9B, in an initial step, practice insert 150, having slidable portion 110 disposed adjacent front wall 158 thereof, is slid into opening 210 of magazine 200. Turning to FIGS. 10A to 10C, it is seen that, once practice insert 150 is inserted into magazine 200, flanges 166 of practice insert are aligned with, and are held by, feed lips 212. Additionally, protrusion 168 pushes follower 208 in a downward direction, as seen clearly in FIG. 10C.

Figures 11A, 11B:
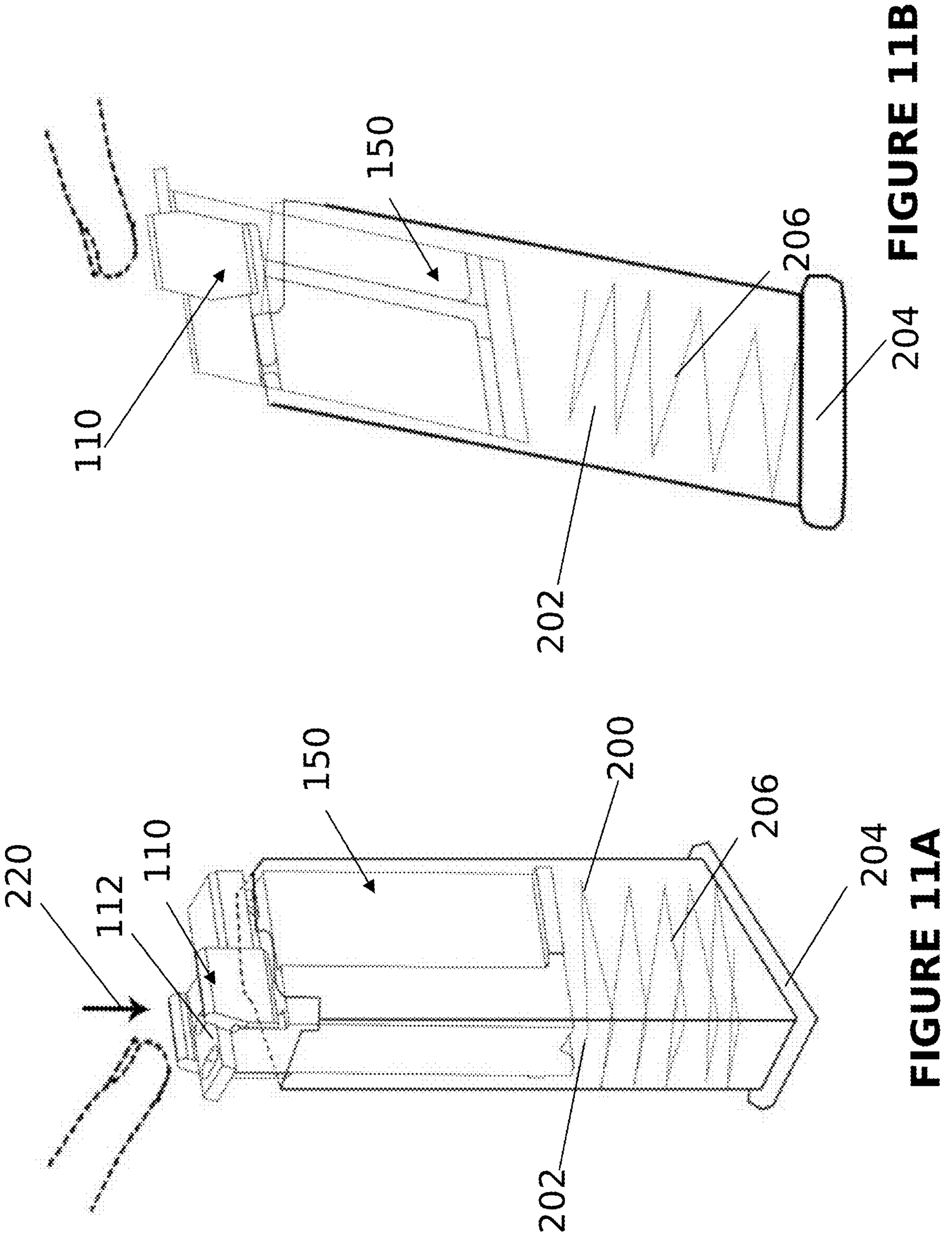
FIG. 11A is, a perspective view illustration of a third step of loading a firearm magazine with the practice insert of FIGS. 5 to 8 according to embodiments of the disclosed technology.
FIG. 11B is a side view planar illustration of the third step of loading a firearm magazine with the practice insert of FIGS. 5 to 8 according to embodiments of the disclosed technology.

In a next step, shown in FIGS. 11A and 11B, practice insert 150 is pushed downward into magazine 200, against follower 208 (see FIG. 9A) and against the force of spring 206, for example by a user applying pressure to slidable portion 110 in the direction of arrow 220. Typically, insert 150 is pushed downward enough such that bends 122 and 132 of slidable portion 110 are disposed at a suitable height so that when slidable portion 110 is pushed rearwardly relative to body 152 of insert 150, in the direction of arrow 222, as shown in FIGS. 12A and 12B, bends 122 and 132 engage, and are held by, feed lips 212 of the magazine body.

Figures 12A, 12B:
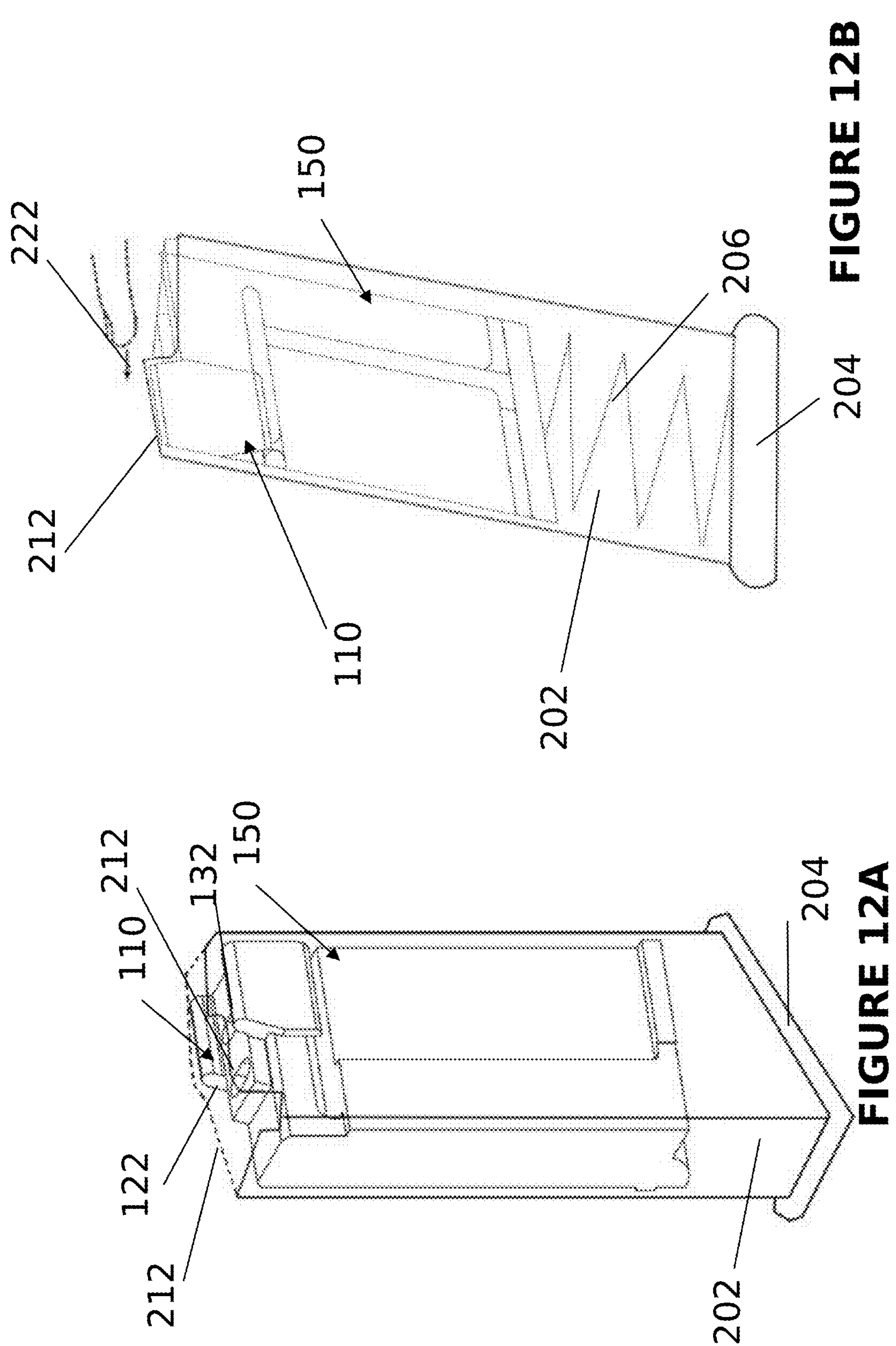
FIG. 12A is a perspective view illustration and a side view planar illustration of a fourth step of loading a firearm magazine with the practice insert of FIGS. 5 to 8 according to embodiments of the disclosed technology.
FIG. 12B is a side view planar illustration of the fourth step of loading a firearm magazine with the practice insert of FIGS. 5 to 8 according to embodiments of the disclosed technology.
Figure 13A:
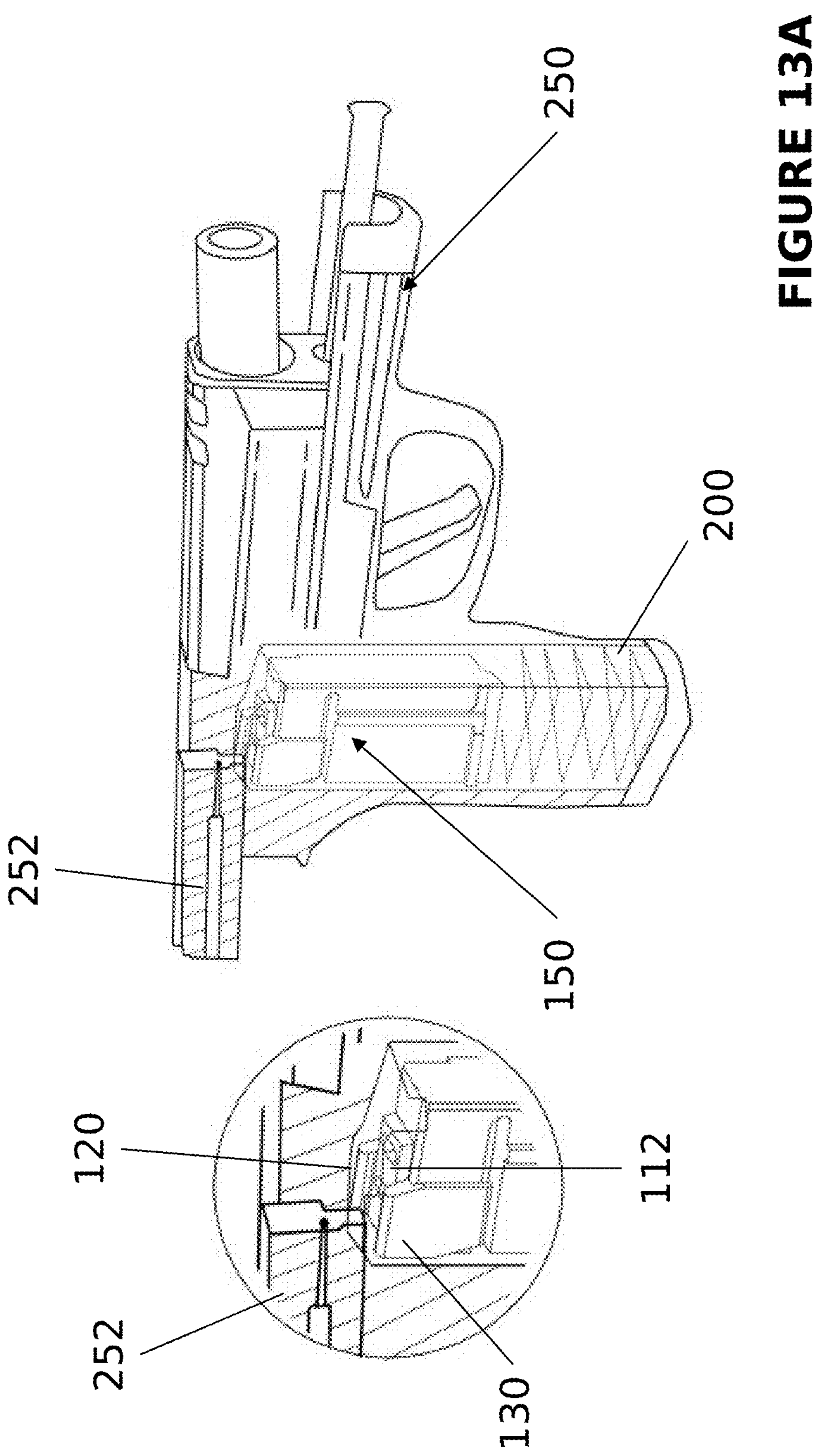
FIG. 13A is a first perspective view illustrations of use of a firearm loaded with the magazine of FIGS. 12A and 12B, according to the embodiments of the disclosed technology.
Figure 13B:
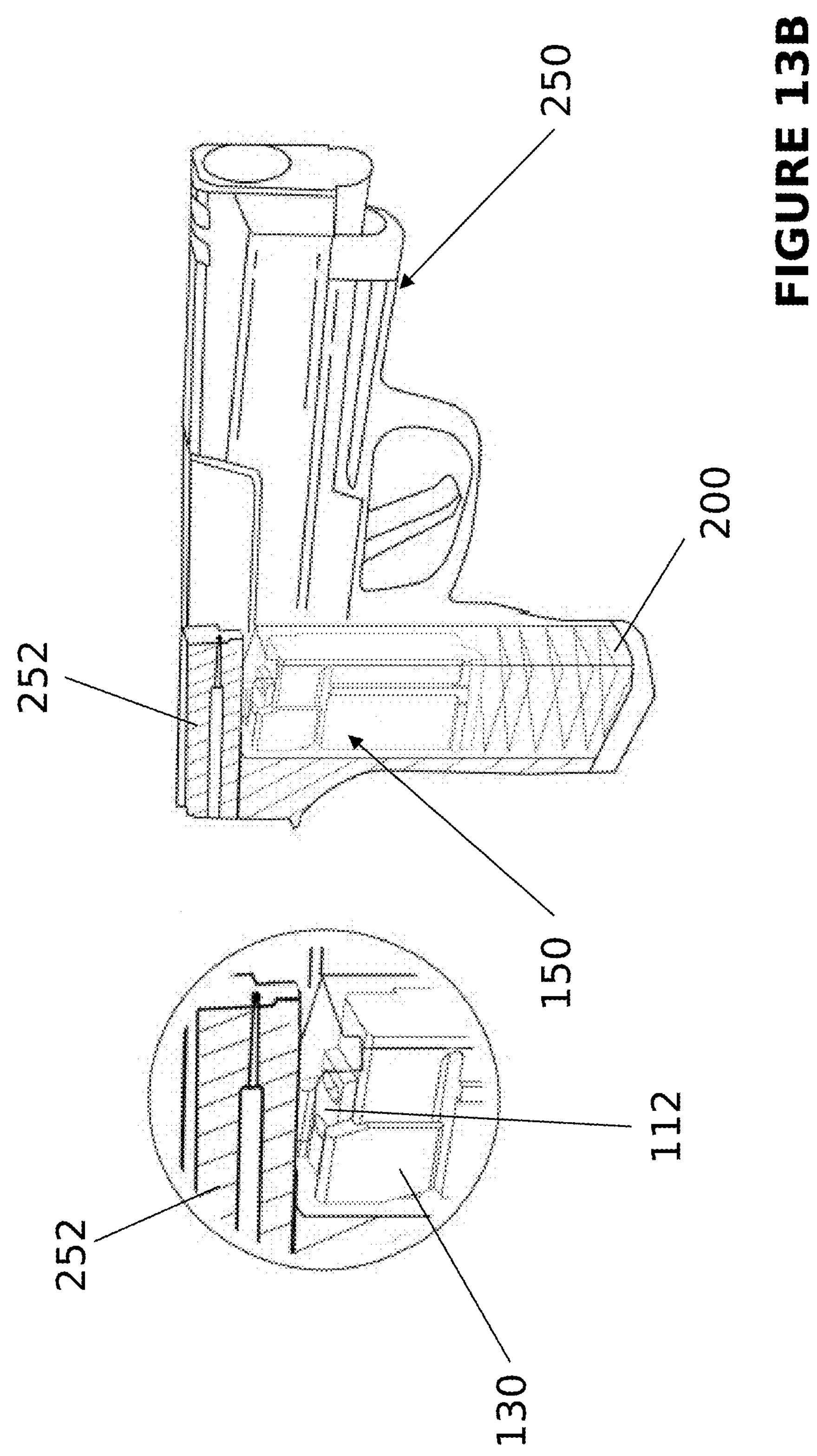
FIG. 13B is a perspective view illustrations of use of a firearm loaded with the magazine of FIGS. 12A and 12B, according to the embodiments of the disclosed technology.

FIGS. 13A and 13B are perspective view illustrations of use of a firearm loaded with the magazine of FIGS. 12A and 12B, according to the embodiments of the disclosed technology.

Figure 14B:
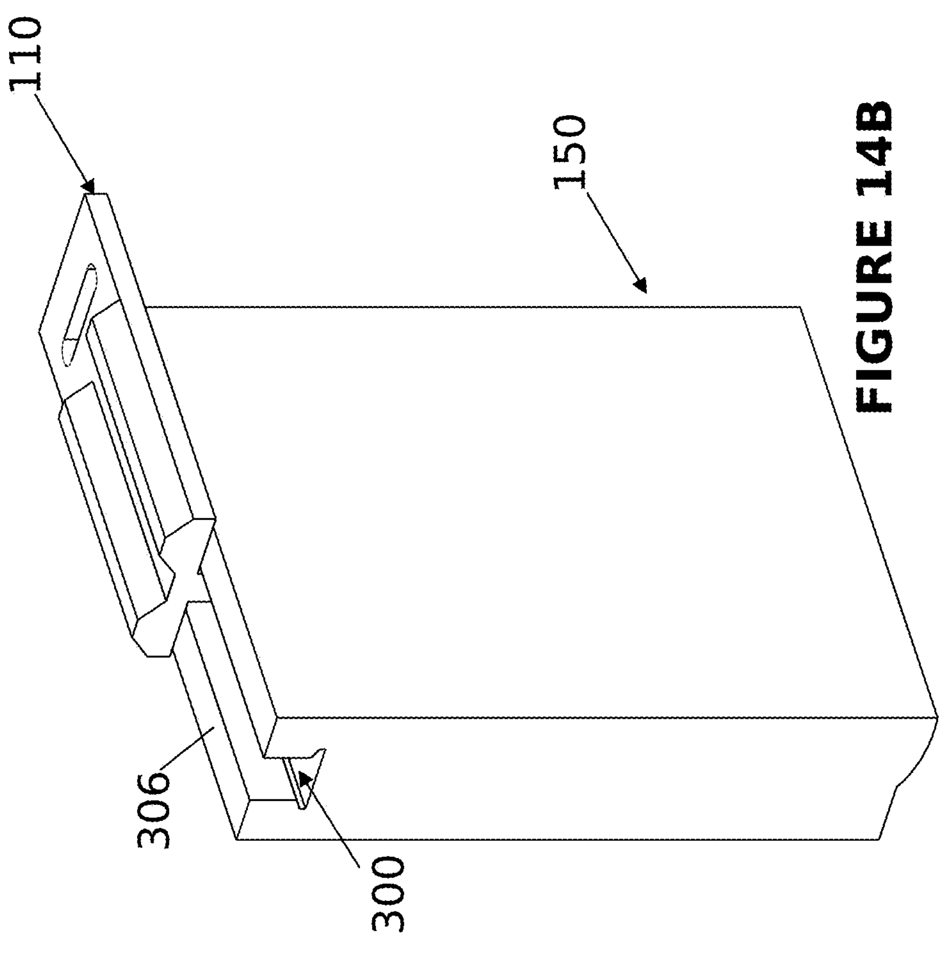
FIG. 14B is a perspective view of the slideable portion having a protrusion of FIG. 14A slidably disposed within a channel of the top surface of the body, according to embodiments of the disclosed technology.
Figure 14A:
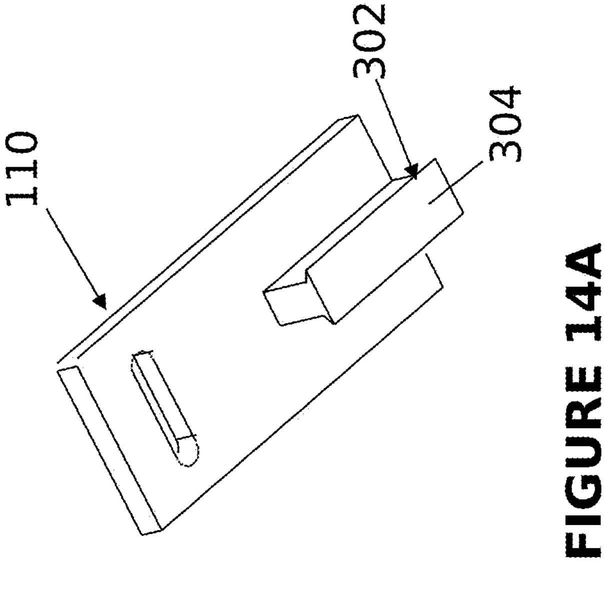
FIG. 14A is a perspective view of the slideable portion having a protrusion according to embodiments of the disclosed technology.

Turning to FIG. 14A, FIG. 14A is a perspective view of the slidable portion 110 according to embodiments of the disclosed technology. The slidable portion 110 has an elongated prismatic protrusion 302.

Turning to FIG. 14B, FIG. 14B is a perspective view of the slideable portion 110 slidably disposed within a channel 300 in the top surface 306 of the body 150, according to an embodiment of the disclosed technology. The channel 300 has a prismatic shape congruent to the prismatic shape of the protrusion 302. For purposes of this disclosure, "congruent" is defined as "equal in angle and dilated between 0% and 5%, inclusive." A planar surface 304 of the protrusion 302 is parallel to the top surface 306 of the body 150 whilst the slidable portion is slidably disposed within the channel 300.

Figure 15B:
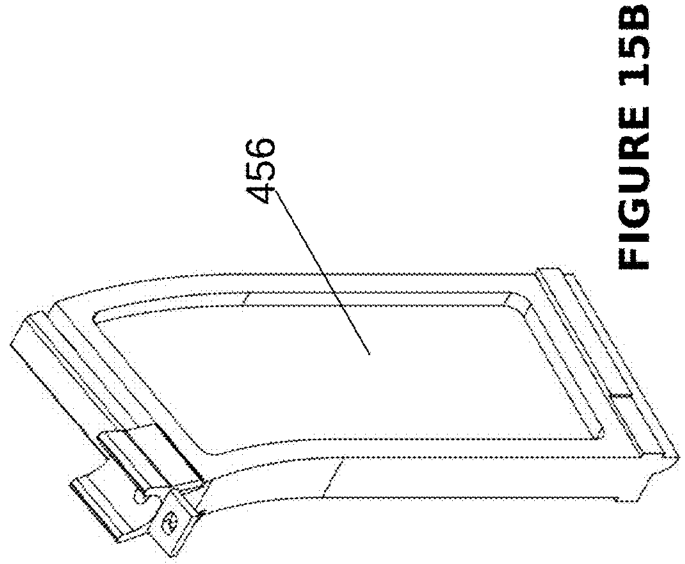
FIGS. 15A and 15B show a perspective view of a slidable portion of a practice insert for a firearm magazine according to another embodiment of the disclosed technology
Figure 15A:
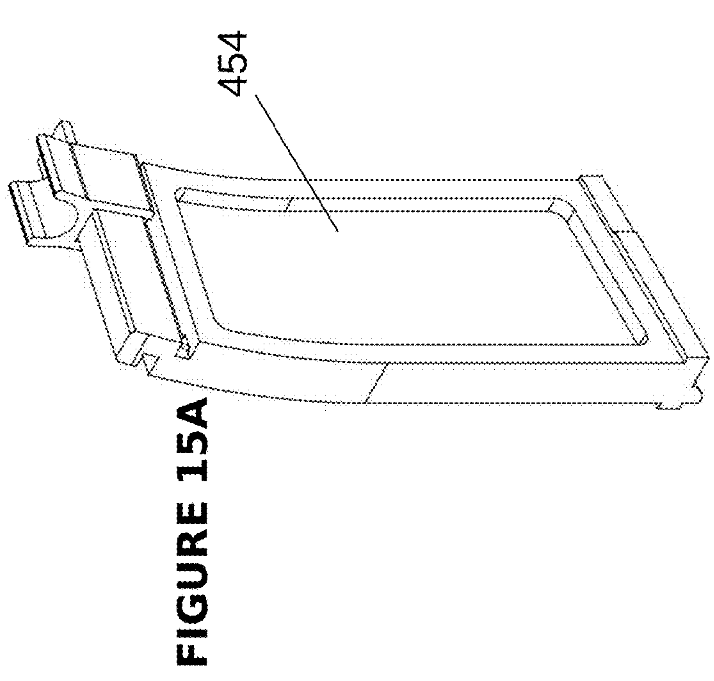

FIGS. 15A and 15B reference sides 454 and 456 which show material having to be removed from the main body for functional utility to achieve the proper weight.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein above are also contemplated and within the scope of the invention.

We claim:

1. A weighted safety-insert for a magazine of a firearm, the weighted safety-insert comprising:
- a body, comprising:
  - first and second side walls;
  - front and back walls;
  - a bottom surface;
  - a top surface;
  - a protrusion extending downwardly from the bottom surface; and
  - a pair of flanges extending outwardly from the side walls of the body, adjacent the bottom surface thereof; and
- a slidable portion, having a top surface resting against the top surface of the body.

2. The weighted safety-insert of claim 1, the slidable portion further comprising:
- a first channel and a second channel extending within the first side wall and the second side wall, respectively; and
- first and second side walls disposed on opposing lateral sides of the top surface of the slidable portion, each having an upper end disposed higher than the top surface of the slidable portion, and each terminating in an inwardly facing lip;
- wherein the slidable portion is adapted to engage the body such that the inwardly facing lips of the slidable portion are slidably disposed within the channels in the side walls of the body.

3. The weighted safety-insert of claim 1, further comprising:
- an elongated prismatic protrusion of the slidable portion; and
- a channel in the top surface of the body, the channel having a prismatic shape congruent to the prismatic shape of the protrusion;
- wherein:
  - the elongated prismatic protrusion is insertable within the channel in the top surface such that the elongated protrusion is slidably disposed within the channel of the top surface.

4. The weighted safety-insert of claim 3, further comprising:
- a planar surface of the protrusion, which, whilst the slidable portion is slidably disposed within the channel of the top surface, is parallel to the top surface.

5. The weighted safety-insert of claim 2, wherein the top surface of the body is angled relative to the bottom surface of the body, and wherein the channels are substantially parallel to the top surface of the body.

6. The weighted safety-insert of claim 2, wherein the slidable portion further includes first and second walls segments extending substantially at a substantially right angle relative to the top surface of the slidable portion, and connecting to the upper ends of the side walls of the slidable portion by bends, such that the wall segments are substantially parallel to the side walls of the slidable portion.

7. The weighted safety-insert of claim 2, wherein, within the slidable portion, the inwardly facing lip of the first wall is disposed further away from the top surface than the inwardly facing lip of the second wall.

8. The weighted safety-insert of claim 7, wherein, within the body, the channel in the first side wall is disposed further away from the top surface than the channel in the second side wall, to accommodate the locations of the inwardly facing lips of the slidable portion.

9. The weighted safety-insert of claim 2, wherein the protrusion of the body includes a planar wall which is substantially aligned with the first side wall of the body, and a curved wall connecting an end of the planar wall to the bottom surface.

10. The weighted safety-insert of claim 1, where within the body, contains a single or plethora of cuts or holes which remove excess material from the main body of the insert to accommodate varying weights to match a corresponding caliber of equal weighted bullets.

11. A magazine for a firearm, the magazine comprising:
- a hollow body terminating, at a bottom end thereof, in a base plate and defining an upper opening, the upper opening being lined by feed lips;
- a spring having a first end attached to the base plate and a second end attached to a follower; and
- the weighted safety-insert of claim 2, wherein the protrusion of the body engages the follower, and the upper ends of the side walls of the slidable portion engage the feed lips, such that the spring is compressed by presence of the weighted safety-insert within the hollow body of the magazine.

12. The magazine of claim 10, wherein at least one of a weight, a weight distribution, and a center of gravity of the magazine is equal to a corresponding measurement of a standard magazine for the firearm, at least partially loaded with rounds.

13. The magazine of claim 10, wherein, when the magazine is loaded within the firearm, during racking of the slide of the firearm, the slide passes between the side walls of the slidable portion and is not obstructed by the weighted safety-insert.

14. A method of inserting the weighted safety-insert of claim 2 into a firearm magazine, comprising:
- arranging the slidable portion to be flush with the front wall of the body of the weighted safety-insert;
- sliding the weighted safety insert into an upper opening of the magazine, such that the protrusion engages a follower of the magazine, and the flanges are disposed beneath feed lips surrounding the upper opening of the magazine;
- pushing the weighted safety-insert downward into a body of the magazine against the follower, thereby compressing a spring disposed within the body of the magazine and connected to the follower; and
- sliding the slidable portion toward the back wall of the body of the weighted safety-insert, such that upper ends of the side walls of the slidable portions engage, and are limited by, the feed lips of the magazine, thereby securing the weighted safety-insert within the body of the magazine.

* * * * *